(12) United States Patent
Kaneda et al.

(10) Patent No.: US 8,424,903 B2
(45) Date of Patent: Apr. 23, 2013

(54) VEHICULAR INTERIOR PARTS

(75) Inventors: Toshihisa Kaneda, Kanagawa (JP); Saori Aoyama, Kanagawa (JP); Jirou Watanabe, Kanagawa (JP); Daisuke Tabata, Kanagawa (JP)

(73) Assignee: Kasai Kogyo Co., Ltd., Kouza-Gun, Kanagawa (JP)

( * ) Notice: Subject to any disclaimer, the term of this patent is extended or adjusted under 35 U.S.C. 154(b) by 188 days.

(21) Appl. No.: 12/735,990

(22) PCT Filed: Apr. 8, 2009

(86) PCT No.: PCT/JP2009/057167
§ 371 (c)(1),
(2), (4) Date: Oct. 13, 2010

(87) PCT Pub. No.: WO2009/125783
PCT Pub. Date: Oct. 15, 2009

(65) Prior Publication Data
US 2011/0025026 A1    Feb. 3, 2011

(30) Foreign Application Priority Data
Apr. 11, 2008 (JP) .................. 2008-103246

(51) Int. Cl.
*B60R 21/215* (2011.01)
*B60R 21/21* (2011.01)

(52) U.S. Cl.
USPC ..................... 280/728.3; 280/730.2

(58) Field of Classification Search ............... 280/728.3, 280/730.1, 730.2, 732
See application file for complete search history.

(56) References Cited

U.S. PATENT DOCUMENTS
5,868,421 A * 2/1999 Eyrainer ............ 280/730.2
6,325,410 B1 * 12/2001 Eyrainer ............ 280/730.2
(Continued)

FOREIGN PATENT DOCUMENTS
JP    11-170953    6/1999
JP    2002-225662   8/2002
(Continued)

*Primary Examiner* — Paul N Dickson
*Assistant Examiner* — George Spisich
(74) *Attorney, Agent, or Firm* — McGinn IP Law Group, PLLC

(57) ABSTRACT

To provide an automotive interior part surely deploying an airbag as a result of a smooth opening and fracture of an interior-part main body onto which an outer cover is attached at the time of the deployment of the airbag.

The present invention includes: a door-upper main body 5 covering a vehicle compartment side of a door panel 14; a deployment section 2a deployed in tune with the deployment of an airbag 11 toward inside the vehicle compartment; and an outer cover having an outer-cover main body 6 continuously covering the door-upper main body 5 and the deployment section 2a and an overhang section 130 hung over by folding a terminal end thereof. The overhang section 13 includes: an area 13b having a long overhang length that extends from the end on the door-upper main body 5 side of the overhang section to the opposite end of the door upper main body 5 of the overhang section and an area 13a having a short overhang length of the same; and a borderline section 22 that is arranged along a borderline between the area 13b having the long overhang length and the area 13a having the short overhang length and that initiates the fracture of the terminal end of the outer cover when the airbag 11 is deployed.

9 Claims, 6 Drawing Sheets

U.S. PATENT DOCUMENTS

| | | | |
|---|---|---|---|
| 6,991,253 B2 * | 1/2006 | Webber | 280/728.3 |
| 7,338,072 B2 * | 3/2008 | Suekuni et al. | 280/730.2 |
| 7,547,040 B2 * | 6/2009 | Hofmann | 280/730.2 |
| 7,552,940 B2 * | 6/2009 | Lindemann et al. | 280/730.2 |
| 7,581,751 B2 * | 9/2009 | Ochiai et al. | 280/730.2 |
| 7,766,380 B2 * | 8/2010 | Tonooka et al. | 280/730.2 |
| 7,798,519 B2 * | 9/2010 | Kawabe et al. | 280/728.3 |
| 7,874,577 B2 * | 1/2011 | Kaneda et al. | 280/728.2 |
| 2004/0155441 A1 * | 8/2004 | Hofmann | 280/730.2 |
| 2006/0061072 A1 | 3/2006 | Suekuni et al. | |
| 2006/0208468 A1 * | 9/2006 | Riester et al. | 280/730.2 |
| 2007/0046000 A1 * | 3/2007 | Sato et al. | 280/730.2 |

FOREIGN PATENT DOCUMENTS

| | | |
|---|---|---|
| JP | 2003-81049 | 3/2003 |
| JP | 2006-88731 | 4/2006 |
| WO | WO 2005/090132 * | 9/2005 |

* cited by examiner

VEHICULAR INTERIOR PARTS

TECHNICAL FIELD

The present invention relates to automotive interior parts. In particular, the present invention relates to an automotive interior part in a door, a rear side, a luggage side, a pillar, and a roof, for example, having an interior-part main body mounted on a vehicle compartment side of a vehicle body panel, an airbag equipped between the vehicle body panel and the interior-part main body, and an outer cover exteriorly covering the vehicle compartment side of the interior-part main body.

BACKGROUND ART

Conventionally, an automotive airbag is a device, concealed inside a door trim, for example, for protecting a passenger from the impact caused upon collision by expanding and deploying upon collision. When the airbag is expanded and deployed, there is a need of deforming one portion of the trim in a direction into which the airbag is deployed. Thus, there is proposed a technique in which the one portion of the trim that is an obstacle upon deployment of the airbag is easily deformed into the vehicle compartment side from a mounting state by pressing of the airbag, resulting in the airbag surely being deployed.

This leads to a proposal of a technique in which a fragile section is arranged on the top surface of a door trim upper, when the airbag is upwardly deployed, the trim in a vehicle upper direction above the fragile section is deployed by the pressing of the airbag, enabling a smooth deployment of the airbag (see Patent Literature 1).

Citation List

[Patent Literature]
[PTL1]
Japanese Unexamined Patent Publication No. 2006-88731

SUMMARY OF THE INVENTION

FIG. 1A is a cross-sectional view simply showing a cross section of an upper section of a conventional automotive door. FIG. 1B is an enlarged cross-sectional view simply showing an upper end B of a door upper trim 2 in FIG. 1A.

As shown in FIG. 1A, a door upper trim 2 is configured of a door-upper main body 5, a door-upper outer cover 6, a cushioning material, etc. The door-upper main body 5 is molded by a material such as PPC, and configures the shape of the door upper trim 2. The door-upper outer cover 6 is attached on a vehicle compartment side of the door-upper main body 5. In order to improve the appearance of the vehicle compartment, a resin material or a material obtained by coating the resin material with paint or a decorative cloth material, etc., are used for the door-upper outer cover 6. Similarly, a door center trim 3 is configured of a door-center main body 7, a door-center outer cover 8, a cushioning material, etc. Between a door inner panel 14 and the door-upper main body 5, an airbag unit 10 is installed. In the door-upper main body 5 in the vicinity of the airbag unit 10, there is arranged a hinge 12 so that a deployment section 2a arranged above the door-upper main body 5 can move smoothly when the airbag is deployed from the airbag unit 10.

As shown in FIG. 1B, at the upper end of the door upper trim 2, a waist garnish 9 contacts the upper end of the door-upper main body 5 from below. The waist garnish 9 is molded by using the same material as that of the door-upper main body 5 so as to withstand a load charged from above at the upper end of the door upper trim 2. The door-upper outer cover 6 is hung over from the upper end of the door-upper main body 5 to the waist garnish 9 in a manner to be rolled in from the inside the vehicle compartment. In the door-upper outer cover 6, a region attached to the waist garnish 9 is defined as an overhang section 13. The vehicle compartment can be decorated seamlessly by the door-upper outer cover 6, and thus, the door-upper main body 5 and the waist garnish 9 cannot be seen from the passenger. Besides, although not shown, in the case of absence of other parts around the end of the door-upper main body 5, the overhang section 13 may be arranged on a vehicle body panel side of the door-upper main body.

However, as shown in FIG. 1B, the overhang section 13 is attached onto the waist garnish 9 from the terminal end of the door-upper main body 5 in a manner to be rolled in from inside the vehicle compartment. Thus, due to its attaching force, the overhang section 13 comes to inhibit the deployment of the door-upper main body 5 toward the vehicle compartment side at the time of the deployment of the airbag. Moreover, the door-upper outer cover 6, which uses a resin material, is hard to be fractured and is not cut stably by each component. Thus, a strong resistance occurs at the time of deployment of the door-upper main body 5.

Therefore, the present invention has been achieved in view of the above-described circumstances, and an object thereof is to provide an automotive interior part capable of surely deploying an airbag as a result of a smooth deployment of a portion onto which an outer cover is attached at the time of the deployment of the airbag.

In order to solve the above-described problems, an automotive interior part as set forth in claim 1 comprises: an interior-part main body covering a vehicle compartment side of a vehicle body panel; a deployment section deployed in tune with the an airbag, arranged between the vehicle body panel and the interior-part main body, deploying toward inside the vehicle compartment; and an outer cover including: an outer-cover main body continuously covering the interior-part main body and the deployment section; and an overhang section hung over by folding a terminal end thereof. The overhang section includes: an area having a long overhang length that extends from the end on the terminal end side of the interior-part main body of the overhang section to the terminal end of the overhang section and an area having a short overhang length of the same; and a borderline section that is arranged along a borderline between the area having the long overhang length and the area having the short overhang length and that initiates the fracture of the terminal end of the outer cover when the airbag is deployed.

According to the invention as set forth in claim 1, a portion inhibiting the deployment of the airbag is arranged as the deployment section at a position to correspond to a position of the airbag. Then, an outer cover is attached onto the interior-part main body in a manner to maintain the vehicle compartment side's ascetic appeal. For a purpose of improving the appearance, an overhang section is arranged in the outer cover in a manner to protrude from the terminal end of the interior-part main body. As the shape of the overhang section, the overhang section includes: an area having a long overhang length and an area having a short overhang length; and a borderline section that is arranged along a borderline between the area having the long overhang length and the area having the short overhang length and initiates the fracture of the terminal end of the outer cover at the time of the deployment of the airbag.

In the overhang section, due to the presence of the area having the long overhang length and the area having the short overhang length, a difference in adherence intensity occurs. As a result, at the time of the deployment of the airbag, the borderline section serves as a reference point at which the outer cover is fractured (fracture reference point). In this case, the borderline section preferably is angular, for example. Moreover, a cutaway may be formed in the borderline section. When the cutaway is formed, the fracture reference point becomes more distinct, enabling a facilitated concentration of a load onto the borderline section. This facilitates the fracture of the outer cover, in particular, when a strong material is used as the outer cover, for example.

The invention as set forth in claim 2 is characterized in that the area having the short overhang length is arranged in a portion corresponding to the deployment section and the area having the long overhang length is arranged in a portion not corresponding to the deployment section. Thus, when the deployment section opens, the load is concentrated onto the overhang section (where the adherence intensity is weak) of the deployment section. As a result, the outer cover is more easily fractured from the borderline section.

The invention as set forth in claim 3 is characterized in that the borderline section is arranged at a position at which the outer cover fractured at the time of the deployment of the airbag covers a circumference of the deployment section. According to this configuration, the end of the deployment section can be covered with the fractured outer cover, and thus, even when the end of the deployment section comes into contact with a passenger at the time of the deployment of the airbag, the outer cover serves as a cushion, resulting in securing of the safety of the passenger.

BEST MODE FOR CARRYING OUT THE INVENTION

Hereinafter, a best mode embodiment of the present invention will be explained with reference to the accompanying drawings. It is noted that, an embodiment of the present invention will be explained with reference to FIG. 2 to FIG. 6 as an example in which the present invention is applied to an automotive door trim.

Figure 1A:
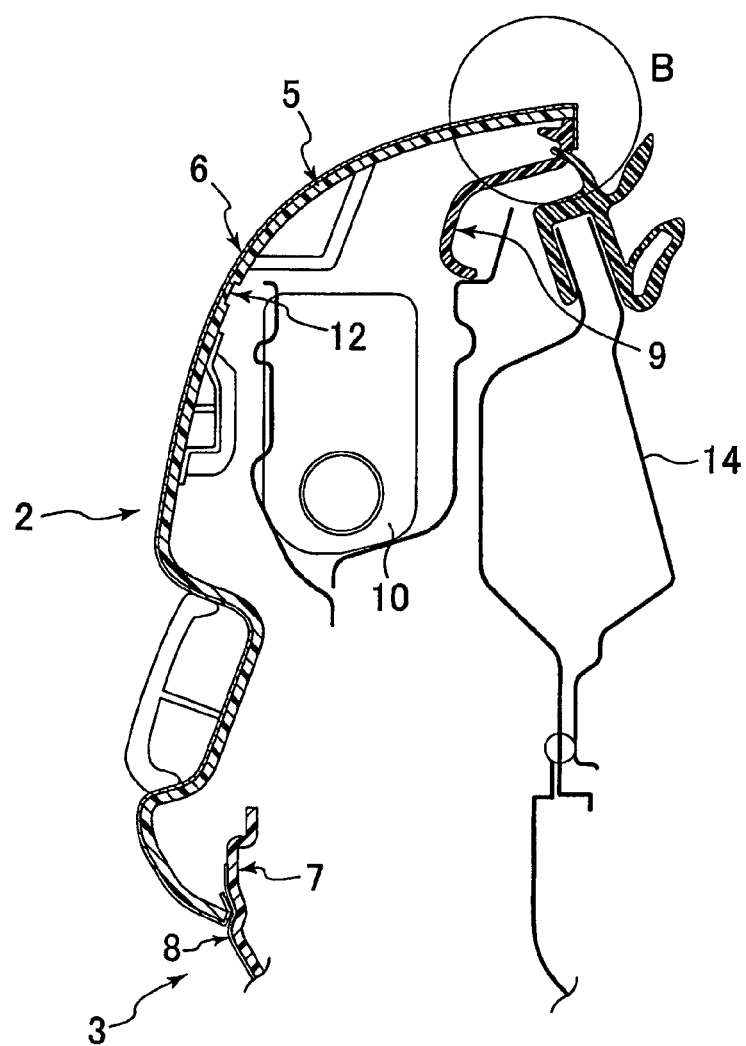
FIG. 1A is a cross-sectional view briefly showing a cross section of an upper portion of a conventional automotive door.
Figure 1B:
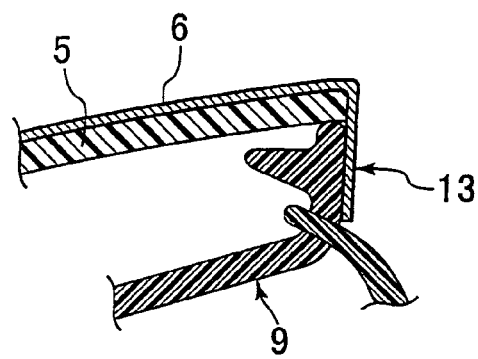
FIG. 1B is an enlarged cross-sectional view briefly showing an upper end B of a door upper trim 2 in FIG. 1A.
Figure 2:
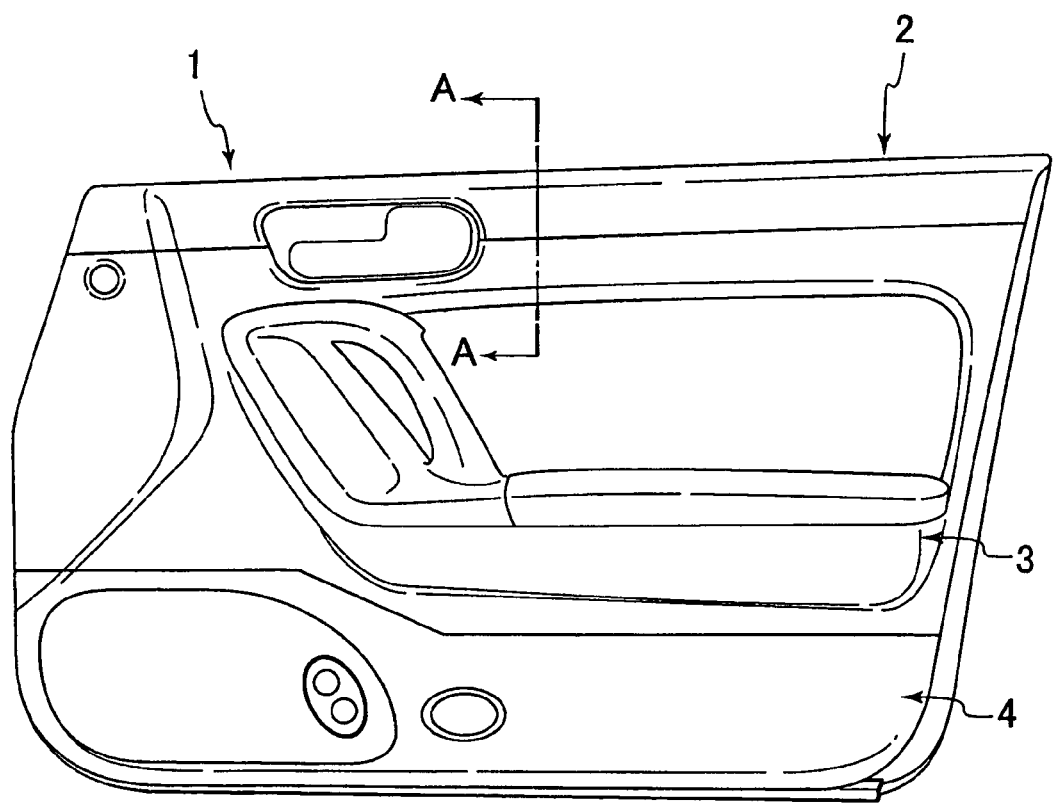
FIG. 2 is a front view of an automotive door 1, as seen from a vehicle compartment side, according to an embodiment of the present invention.
Figure 3:
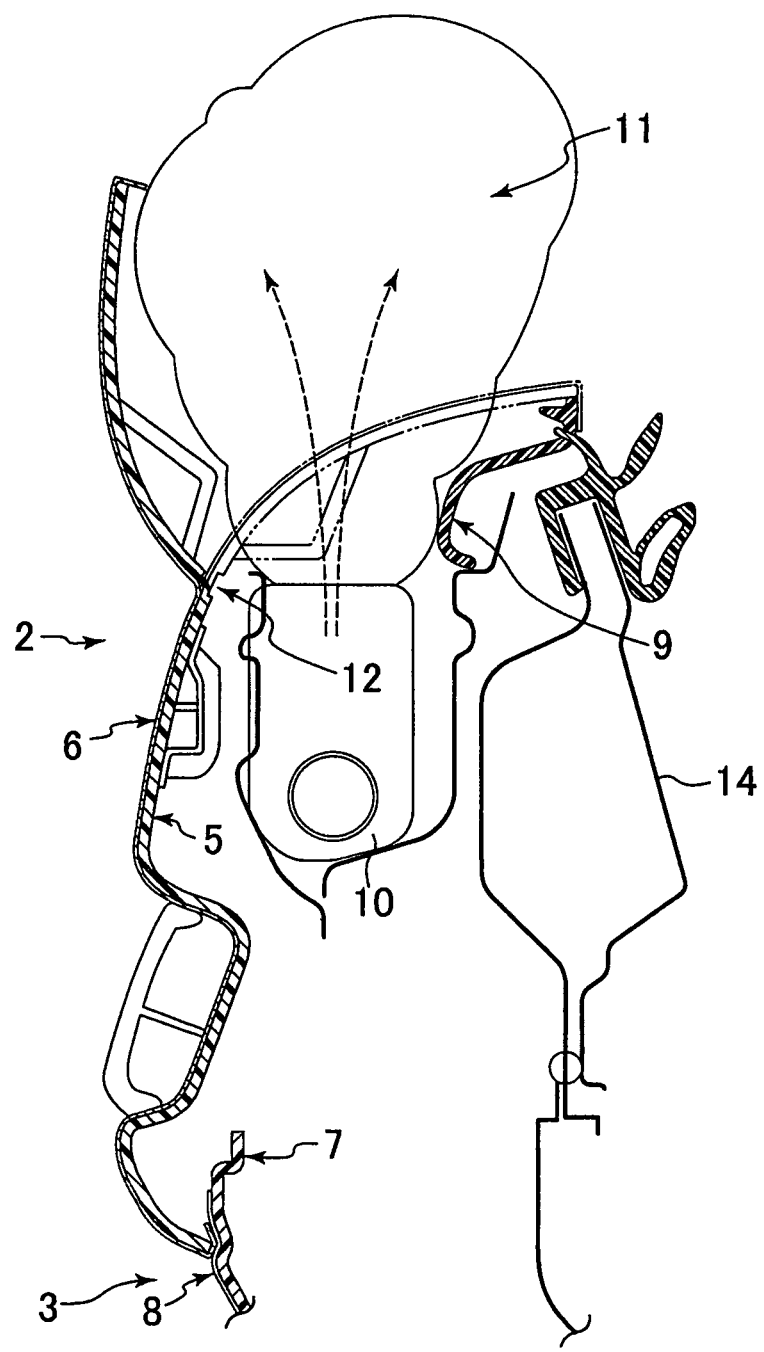
FIG. 3 is a cross-sectional view briefly showing a cross section along a line A-A of the automotive door 1 in FIG. 2.
Figure 4A:
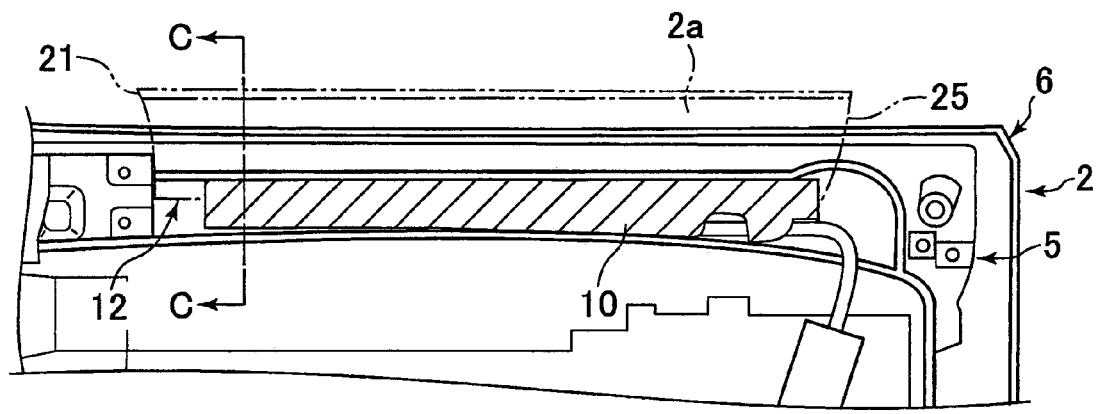
FIG. 4A is a configuration view expressing structures of a door trim and an airbag unit 10, as seen from a door inner panel side.
Figure 4B:
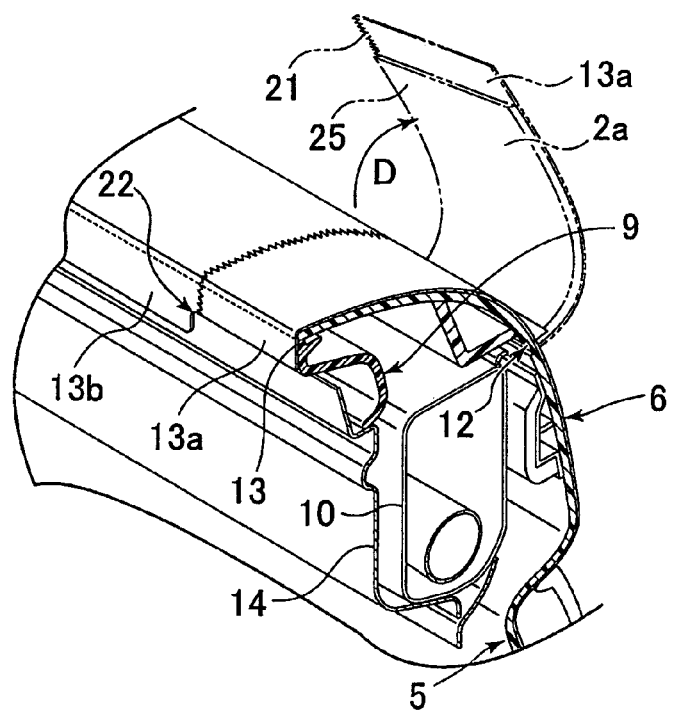
FIG. 4B is a cross section along a line C-C of FIG. 4A, which is a structure of an upper portion of the door trim configuring the present invention.
Figure 5:
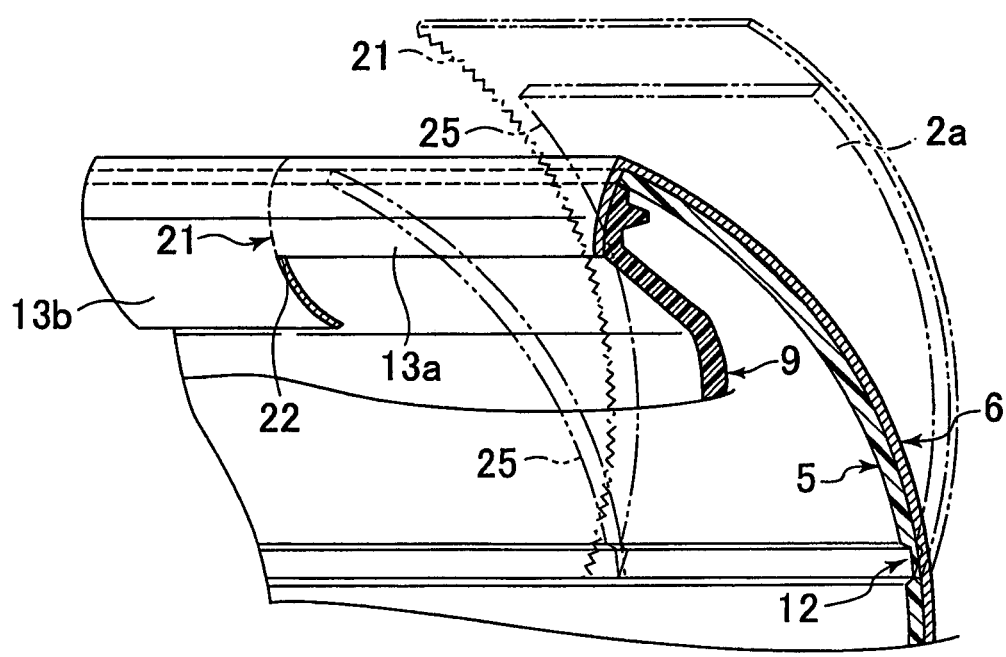
FIG. 5 is a configuration view obtained when borderline sections of FIGS. 4A and 4B are moved.
Figure 6A:
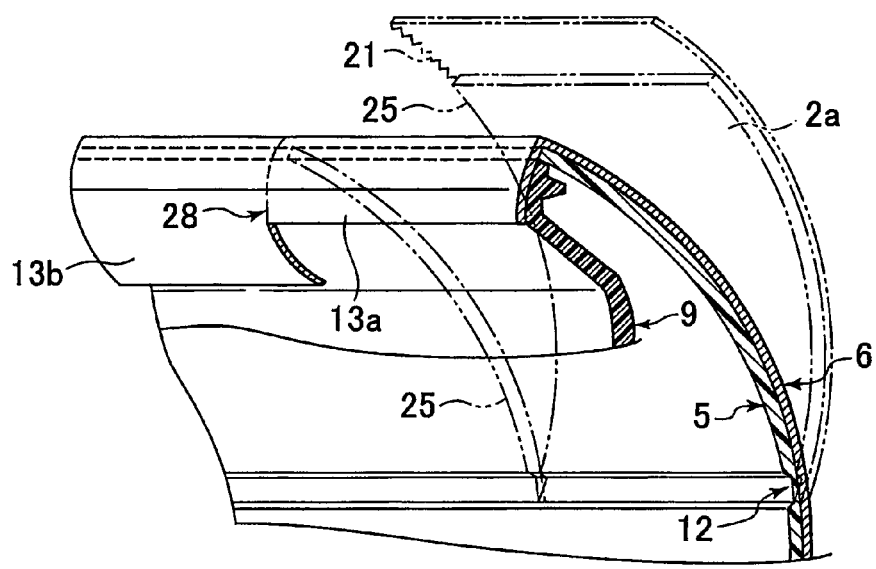
FIG. 6A is a configuration view obtained when a linear cutaway is formed in the borderline section, and FIG. 6B, which is a modified example of FIG. 6A, is a configuration view obtained when a V-lettered cutaway is formed in the borderline section.
Figure 6B:
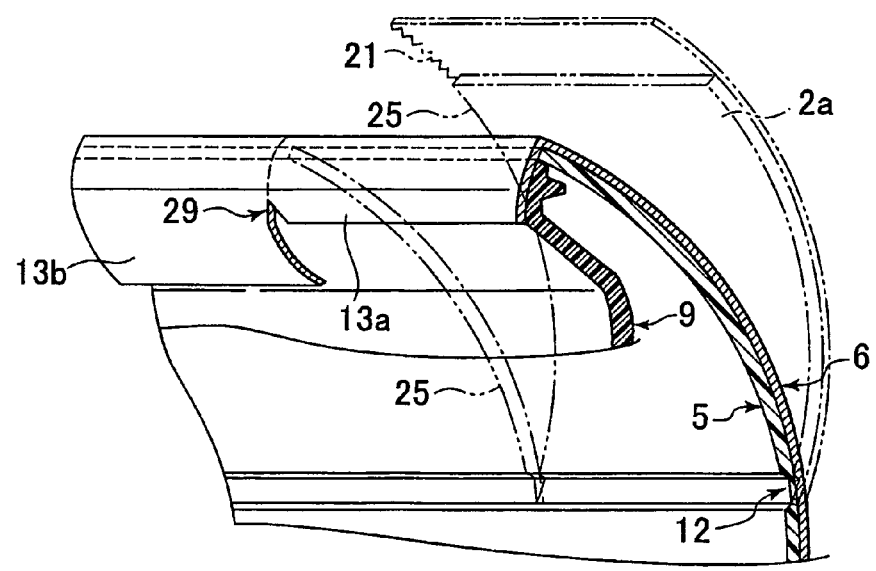

FIG. 2 is a front view of an automotive door 1, as seen from a vehicle compartment side, according to the embodiment of the present invention. FIG. 3 is a cross-sectional view briefly showing a cross section along a line A-A of the automotive door 1 in FIG. 2. FIG. 4A is a configuration view showing structures of a door upper trim 2 and an airbag unit 10, as seen from a door inner panel side. FIG. 4B, which is a cross section along a line C-C of FIG. 4A, is a structural view of a door upper portion configuring the present invention. FIG. 5 is a configuration view obtained when borderline sections of FIGS. 4A and 4B are moved. FIG. 6A is a configuration view obtained when a linear cutaway is formed in the borderline section. FIG. 6B is a configuration view obtained when a V-lettered cutaway is provided in the borderline section.

As shown in FIG. 2, the automotive door 1 is equipped with a door trim (automotive interior part) covering a vehicle compartment side of a door inner panel (vehicle body panel) 14. The door trim is configured of trims divided in a plurality of parts. In this case, at an upper portion on the vehicle compartment side of the automotive door 1, there is arranged a door upper trim 2; at a center portion on the vehicle compartment side of the automotive door 1, there is arranged a door center trim 3; and at a lower portion on the vehicle compartment side of the automotive door 1, there is arranged a door lower trim 4.

FIG. 3 is a cross-sectional view briefly showing a cross section along a line A-A of the automotive door 1 of FIG. 2 and also briefly showing a state where the airbag 11 is deployed as a result of the airbag unit 10 being activated.

As shown in FIG. 3, the airbag unit 10 is attached to the door-upper main body (interior-part main body) 5, and at the same time, there is arranged a deployment section 2a that is deployed in tune with the deployment of the airbag 11 arranged between the door inner panel 14 and the door-upper main body 5 onto inside the vehicle compartment. The deployment section 2a is formed to be surrounded by a thin portion arranged in the door-upper main body 5. The thin portion is formed of a hinge 12a functioning as a hinge at the time of the deployment of the deployment section 2a; and an elevation section 12b elevated from the hinge 12a toward above to extend to the end of the door-upper main body 5. On an outer cover, there are arranged: an outer-cover main body 6a continuously covering the door upper trim 2 and the deployment section 2a; and an overhang section 130 hung over by folding the terminal end thereof. The airbag 11 is deployed toward above from the airbag unit 10, and thus, as a result of pressing of the airbag 11, an upward force is applied to the door-upper main body 5 of the door upper trim 2. By taking advantage of this, the end side of the door-upper main body 5 in the elevation section 12b of the thin portion is firstly cracked, and then, the elevation section 12b is fractured, and at the same time, the deployment section 2a required for the deployment of the airbag 11 is deployed to the vehicle compartment side by using the hinge 12a as an axis. This enables the deployment of the airbag 11. It may be possible to skillfully arrange so that the deployment of the airbag 11 is not inhibited by forming the portion cracked by the pressing of the hinge or the airbag 11 into a slit shape, etc.

FIG. 4A shows a structure of the door upper trim 2 and the airbag unit 10 equipped between the door inner panel 14 and the door upper trim 2, as seen from a door panel 14 side. FIG. 4A also shows a position of the deployment section 2a at the time of the deployment of the airbag 11. In this case, there is arranged the elevation section 12b, which is the thin portion, in an upward direction of the vehicle from the hinge 12a. This elevation section 12b is fractured by the pressing of the airbag 11 at the time of the deployment of the airbag 11, and acts as a side edge 25 of the deployment section 2a.

As shown in FIG. 4B, the overhang section 130 includes: an area 13b having a long overhang length or length from the end of the door-upper main body 5 of the overhang section 130 to the terminal end of the overhang section 130; an area 13a having a short overhang length of the same; and a borderline section 22 that is arranged along a borderline between the area 13b having a long overhang length and the area 13a having a short overhang length and initiates the fracture of the terminal end of the outer cover 6 at the time of the deployment of the airbag 11. In this case, the overhang length of the area 13a is indicated by reference numeral 13a1 and that of the area 13b is indicated by reference numeral 13b1, respectively. The area 13a having the short overhang length is arranged in a portion corresponding to the deployment section 2a, and the area 13b having the long overhang length is arranged in a portion not corresponding to the deployment section 2a. The borderline section 22 is realized by a corner formed by the area 13b having the long overhang length and the area 13a having the short overhang length.

However, in this state, the deployment of the airbag 11 is inhibited, as described above. Thus, as shown in FIG. 4B, the area 13a having a short overhang length and the area 13b having a long overhang length are arranged in the overhang section 130. Then, in the overhang section 130, there is arranged the borderline section 22 that is provided along the borderline between the area 13b having a long overhang length 15 and the area 13a having a short overhang length and that initiates the fracture of the terminal end of the outer cover 6 at the time of the deployment of the airbag. Therefore, when the deployment section 2a is deployed in a D direction by using the hinge 12a as an axis by the deployment of the airbag 11, the borderline section 22 serves as a fracture reference point at which the outer cover of the overhang section 130 is fractured. That is, the change in overhang length results in a difference in adherence intensity at the overhang sections 13a and 13b, and thus, the borderline section 22 serves as the fracture reference point at which the outer cover 6 is fractured at the time of the deployment of the airbag.

As a result, the arrangement of the borderline section 22 on an extended line of the side edge 25 of the deployment section enables the borderline section 22 to effectively fracture the overhang section 130 in the vicinity of the deployment section 2a. That is, it is desired that a fracture line 21 of the outer cover extending from the corner of the borderline section 22 is brought closer to the side edge 25 of the deployment section 2a; however, if the outer cover of the overhang section 130 is effectively fractured at the time of the deployment of the airbag 11, then any shape other than that shown in the figure may be acceptable.

FIG. 5 is a diagram showing a state obtained when the borderline section 22 is moved to stay away from the deployment section 2a. When the borderline section 22 is arranged at a position at which the outer cover fractured at the time of the deployment of the airbag 11 covers the circumference of the deployment section 2a, the circumference (end) 25 of the deployment section 2a can be covered with the fractured outer cover. Thus, even when the end of the deployment section 2a comes into contact with a passenger at the time of the deployment of the airbag 11, the outer cover serves as a cushion, resulting in securing the safety of the passenger.

FIG. 6A is a diagram showing a state obtained by forming a linear cutaway 28 in the borderline section 22 in a manner to correspond to the side edge 25 of the deployment section of the door-upper main body.

As shown in FIG. 4B, when the borderline section 22 is rendered angular, this portion works as the fracture reference point. Moreover, if the fracture reference point can be distinctly structured so as to facilitate receiving the pressing of the airbag 11 so that this borderline section 22 is fractured more effectively, then a much improved deployment capability of the airbag 11 can be acquired. This facilitates the fracture of the outer cover, in particular, when a strong material is used as the outer cover, for example. Further, as shown in FIG. 5, this is effective also when the borderline section 2 is moved.

Unlike FIG. 6A, FIG. 6B is a diagram showing a state where a V-shaped cutaway 29 is formed in a re-entrant portion of the borderline section 22.

Other than the mode shown in FIG. 6A, a wide cutaway 29 can also be formed in the re-entrant portion of the borderline section 22 in this way. In this case, the cutaway 29 is shaped in a V letter; however, a U-letter shape, etc., may also be possible. The formation of a V-letter shape applies stress to an edge portion, resulting in an increased effect of the borderline section 22 to fracture the door-upper outer cover 6.

According to the above-described embodiment, the overhang section 130 includes: the area 13b having the long overhang length and the area 13a having the short overhang length; and the borderline section 22 that is arranged at the borderline between the area 13b having the long overhang length and the area 13a having the short overhang length and that initiates the fracture of the terminal end of the outer cover at the time of the deployment of the airbag 11. In particular, the area 13a having the short overhang length is arranged in a portion corresponding to the deployment section 2a, and the area 13b having the long overhang length is arranged in a portion not corresponding to the deployment section 2a. According to this configuration, the overhang section 130 causes a difference in adherence intensity resulting from the presence of the area 13b having the long overhang length and the area 13a having the short overhang length. As a result, at the time of the deployment of the airbag 11, the borderline section 22 serves as the fracture reference point at which the outer cover is fractured.

Moreover, the borderline section 22 is arranged at a position at which the outer cover fractured at the time of the deployment of the airbag 11 covers the circumference of the deployment section 2a. According to this configuration, the end of the deployment section 2a can be covered with the fractured outer cover, and thus, even when the end of the deployment section 2a comes into contact with a passenger at the time of the deployment of the airbag, the outer cover serves as a cushion, resulting in securing of the safety of the passenger.

In the above-described embodiment, the airbag unit 10 is attached to the door-upper main body 5; however, the airbag unit 10 may also be optionally attached to the door inner panel 14. Also, the overhang section 130 of the outer cover is hung over to the waist garnish 9; however, in the case of absence of the waist garnish 9, the overhang section 130 may be optionally rolled over to be hung over to the bottom surface of the door-upper main body 5.

Thus, the preferred embodiment of the present invention has been explained. In the present invention, various types of changes and modifications can be applied to the structure of the embodiment without departing from the scope of the claims. It should be noted that as an example of the automotive interior part, the door trim is used as an example in the above; however, the present invention is not limited thereto and can be applied to other automotive interior parts such as a rear side and a luggage side. Moreover, a one-body door trim may also be used, instead of the door trim configured of the door upper trim, the door center trim, and the door lower trim.

INDUSTRIAL APPLICABILITY

According to the present invention, it is possible to provide an automotive interior part surely deploying an airbag as a result of a smooth deployment of a portion onto which an outer cover is attached at the time of the deployment of the airbag.

The invention claimed is:

1. An automotive interior part, comprising:
   an interior-part main body covering a vehicle compartment side of a vehicle body panel;
   a deployment section deployed in tune with an airbag, arranged between the vehicle body panel and the interior-part main body, deploying toward the inside of the vehicle compartment; and
   an outer cover including:
      an outer-cover main body continuously covering the interior-part main body and the deployment section; and
      an overhang section extending from the outer-cover main body so as to form an end of the outer cover, the end being folded toward the upper backside of the interior-part main body,
   wherein the overhang section includes:
      an area having a long overhang length that extends from the outer-cover main body futher than an area having a short overhang length, the overhang section configured such, that in a state in which the airbag is not deployed, the area having the long overhang length and the area having the short overhang length comprise an edge of the outer cover; and
      a borderline section that is arranged along a borderline between the area having the long overhang length and the area having the short overhang length and that initiates a fracture of the outer cover when the airbag is deployed.

2. The automotive interior part as set forth in claim 1, wherein the area having the short overhang length is arranged in a portion corresponding to the deployment section and the area having the long overhang length is arranged in a portion not corresponding to the deployment section.

3. The automotive interior part as set forth in claim 2, wherein the borderline section is arranged at a position at which the outer cover fractured at the time of the deployment of the air bag covers an edge of the deployment section.

4. The automotive interior part as set forth in claim 1, wherein the borderline section is arranged at a position at which the outer cover fractured at the time of the deployment of the air bag covers an edge of the deployment section.

5. The automotive interior part as set forth in claim 1, wherein the outer cover includes a hinge disposed between the interior-part main body and the overhang section.

6. The automotive interior part as set forth in claim 1, wherein the borderline section forms a portion of the edge of the outer cover and initiates a fracture of the portion of the edge of the outer cover when the airbag is deployed.

7. The automotive interior part as set forth in claim 1, wherein the borderline section includes a cutaway portion.

8. The automotive interior part as set forth in claim 1, wherein the borderline section is disposed away from the deployment section.

9. The automotive interior part as set forth in claim 1, wherein the overhang section includes a distal end of the outer cover.

* * * * *